(12) United States Patent
Knausdorf et al.

(10) Patent No.: US 8,910,547 B2
(45) Date of Patent: Dec. 16, 2014

(54) COMPUTERIZED, SEGMENTED STEEL RULE TYPE DIE MAKING SYSTEM AND METHOD

(75) Inventors: Peter Knausdorf, Henrietta, NY (US); Linn Hoover, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 699 days.

(21) Appl. No.: 13/093,349

(22) Filed: Apr. 25, 2011

(65) Prior Publication Data

US 2012/0266725 A1    Oct. 25, 2012

(51) Int. Cl.
| | | |
|---|---|---|
| B21K 5/04 | (2006.01) | |
| B21K 5/20 | (2006.01) | |
| B23P 15/40 | (2006.01) | |
| B31F 1/08 | (2006.01) | |
| B31F 1/10 | (2006.01) | |
| B31B 1/00 | (2006.01) | |
| B26F 1/44 | (2006.01) | |

(52) U.S. Cl.
CPC ......... B23P 15/406 (2013.01); B31B 2201/143 (2013.01); B31B 2201/252 (2013.01); B31F 1/08 (2013.01); B31F 1/10 (2013.01); B31B 2201/147 (2013.01); B31B 2201/141 (2013.01); B26F 2001/4463 (2013.01); B31B 2201/257 (2013.01); B31B 1/00 (2013.01); B26F 1/44 (2013.01)

USPC ................................ 76/107.8; 76/4; 76/107.1

(58) Field of Classification Search
USPC ....................................... 76/4, 107.8; 100/221
See application file for complete search history.

(56) References Cited

U.S. PATENT DOCUMENTS

| | | | | |
|---|---|---|---|---|
| 432,959 | A | * | 7/1890 | Thurston ........................ 409/229 |
| 2,991,551 | A | * | 7/1961 | Fogle et al. ........................ 72/84 |
| 4,773,284 | A | * | 9/1988 | Archer et al. ......................... 76/4 |
| 4,848,190 | A | * | 7/1989 | Doslik et al. ......................... 76/4 |
| 4,860,616 | A | * | 8/1989 | Smith .................................. 76/4 |
| 4,966,054 | A | * | 10/1990 | Beck ................................... 76/4 |
| 5,036,736 | A | * | 8/1991 | Hillock et al. .................... 83/23 |
| 5,687,622 | A | * | 11/1997 | Gerhardt ...................... 76/107.1 |
| 5,901,619 | A | * | 5/1999 | Aihara ............................ 76/115 |
| 6,006,638 | A | * | 12/1999 | Eltringham ........................ 83/86 |
| 6,189,414 | B1 | * | 2/2001 | Yoshizawa et al. ................. 76/4 |
| 7,882,720 | B2 | * | 2/2011 | Mizukawa et al. ............. 72/307 |

* cited by examiner

Primary Examiner — Hwei C Payer
(74) Attorney, Agent, or Firm — Alix, Yale & Ristas, LLP

(57) ABSTRACT

A steel rule die making system produces a steel rule dies having an operative surface that form creases and cut patterns in a sheet material to form a box blank. The system includes a die manufacturing station having an indexing bench that securely holds a substrate. At least one slug driver device is disposed adjacent the die manufacturing station to drive the penetrating point of a slug into the substrate. The upper surface of the slug head defines a segment of the operative surface of the steel rule die.

10 Claims, 13 Drawing Sheets

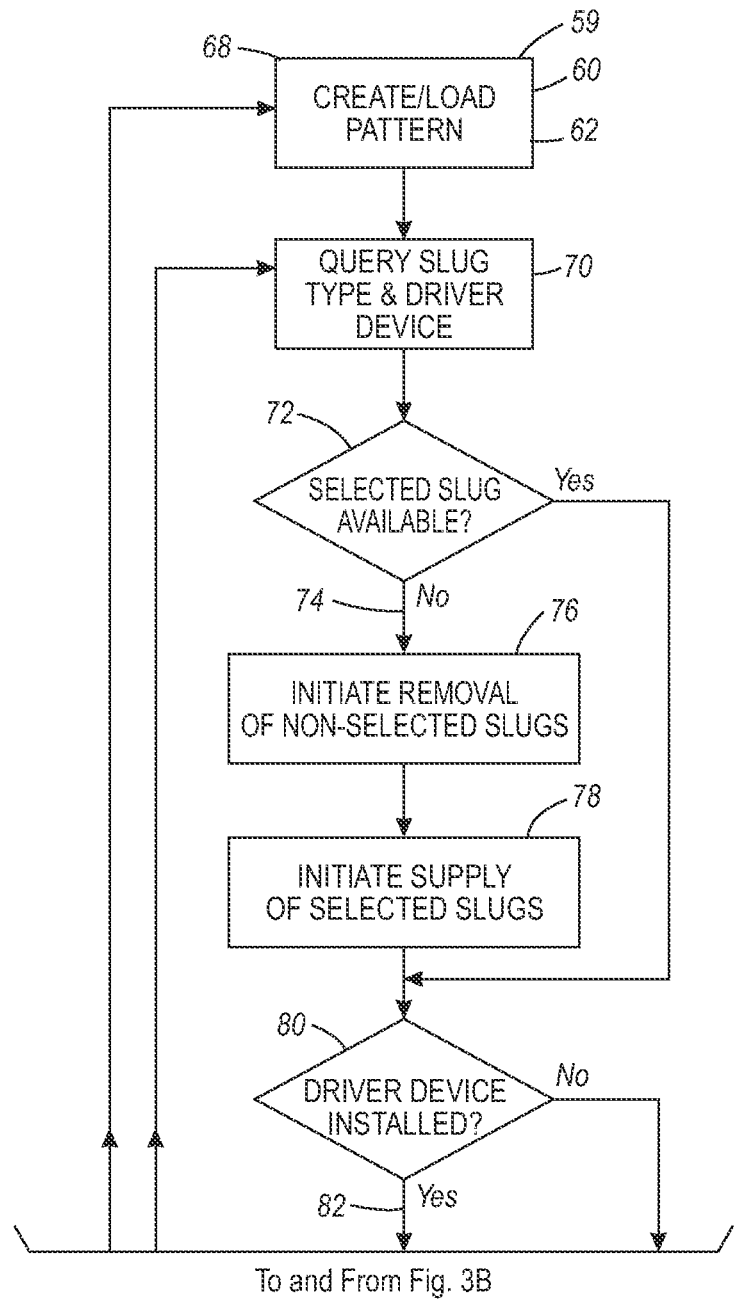

COMPUTERIZED, SEGMENTED STEEL RULE TYPE DIE MAKING SYSTEM AND METHOD

BACKGROUND

This disclosure relates generally to dies for cutting, creasing and perforating sheet materials. More particularly, the present disclosure relates to steel rule dies for cutting, creasing and perforating cardboard and paperboard for making folded carton blanks.

The current method of steel rule die making require a shop equipped with laser cutting, band saw, metal forming and or CNC equipment to manufacture dies. The steel rules are arranged in a predetermined pattern such that the operative surfaces of the steel rules form the desired creasing and cutting patterns in the carton blank. The steel rules are retained either between blocks held in a steel frame or chase by wedges or quoins (block dies) or within slots formed in a rigid die board (jig dies) which, as with the block dies, may be held in a chase with quoins. The male die retaining the steel rules cooperates with the female die, also called the counterplate, to make the impressions in the carton blank.

The process takes days to several weeks of lead time to manufacture a die, which then must be shipped to the customer. The current process of die making to manufacture boxes is geared towards long production runs of boxes and is not cost effective for short runs of boxes or even prototyping of boxes. However, the steel rule die once made makes possible the rapid cutting of box blanks, but the die itself takes time to make.

SUMMARY

There is provided a steel rule die making system, the steel rule dies having an operative surface that form creases and cut patterns in a sheet material to form a box blank. The system comprises a die manufacturing station including an indexing bench that securely holds a substrate. At least one slug driver device is disposed adjacent the die manufacturing station to drive the penetrating point of a slug into the substrate. The upper surface of the slug head defines a segment of the operative surface of the steel rule die.

The steel rule die making system may also comprise a control system in communication with the slug driver device and a positioning system. The positioning system may be connected to the indexing bench and/or the slug driver device such that it may position the indexing bench relative to a driver head of the slug driving device or the slug driving device driver head relative to the indexing bench such that the upper surface of each slug driven by the slug driving device is positioned in the operative surface of the steel rule die.

The steel rule die making system may further comprise multiple slug driver devices, with each of the slug driver devices being adapted to at least one type of slug into the substrate.

The steel rule die making system may further comprise a slug drive device installation system in communication with the control system. The slug drive device installation system connecting the die manufacturing station and a driver device storage area.

The steel rule die making system may further comprise a material transport system in communication with the control system. The material transport system conveying substrate from a substrate supply depot to the die manufacturing station.

The material transport system may also convey slugs from a slug supply depot to the slug driver device.

The control system may include a memory having at least one digital file defining a box pattern and a database having an inventory of the slugs that are available for use by the steel rule die making system and the slug driver devices that are included in the steel rule die making system.

There is also provided a method of making a steel rule die with a die making system, the die having an operative surface adapted to form a box blank from a sheet material. The method comprises positioning the driver head of a slug driver device relative to a substrate at a die making station. The penetrating point of a slug is driven into the substrate with the driver head, whereby the slug is mounted to the substrate. An upper surface of the slug head defines a segment of the die operative surface.

The method may also comprise determining whether a subsequent slug must be mounted to the substrate or whether the steel rule die is complete. The driver head of the slug driver device is repositioned relative to the substrate if a subsequent slug must be mounted to the substrate, and the penetrating point of the subsequent slug is then driven into the substrate with the driver head. This step may be repeated until it is determined that the steel rule die is complete. If it is determined that the steel rule die is complete, the completed die is removed from the die making station.

The method may further comprise determining whether an additional die must be made. If an additional die is required, it is determined whether the additional die is of the same type as the completed die. If the additional die is not the same type as the completed die, a new box pattern is loaded.

The method may further comprise loading a box pattern into the operating system of a control system, and controlling a positioning system with the control system operating system whereby the driver head of the slug driver device is positioned relative to the substrate.

The method may further comprise selecting the slug types that will be used to make the steel rule die, determining whether or not the selected slug is available at the die manufacturing station, and initiating supply of the selected slug to the die manufacturing station if the selected slug is not available at the die manufacturing station.

The method may further comprise determining which slug driver device will be used to mount the selected slugs, determining whether or not the slug driver device is at the die manufacturing station, and initiating supply of the slug driver device to the die manufacturing station if the slug driver device is not available at the die manufacturing station.

Loading a box pattern may include creating a subsequent box pattern; and storing the subsequent box pattern in the control system memory.

The method may further comprise bonding the slugs to the substrate with a phase changing substance after it is determined that the steel rule die is complete and before the completed die is removed from the die making station.

BRIEF DESCRIPTION OF THE DRAWINGS

The present disclosure may be better understood and its numerous objects and advantages will become apparent to those skilled in the art by reference to the accompanying drawings in which:

FIGS. 3A, 3B and 3C depict a flow chart of a method of making a segmented steel rule in accordance with the present disclosure;

DETAILED DESCRIPTION

Figure 1:
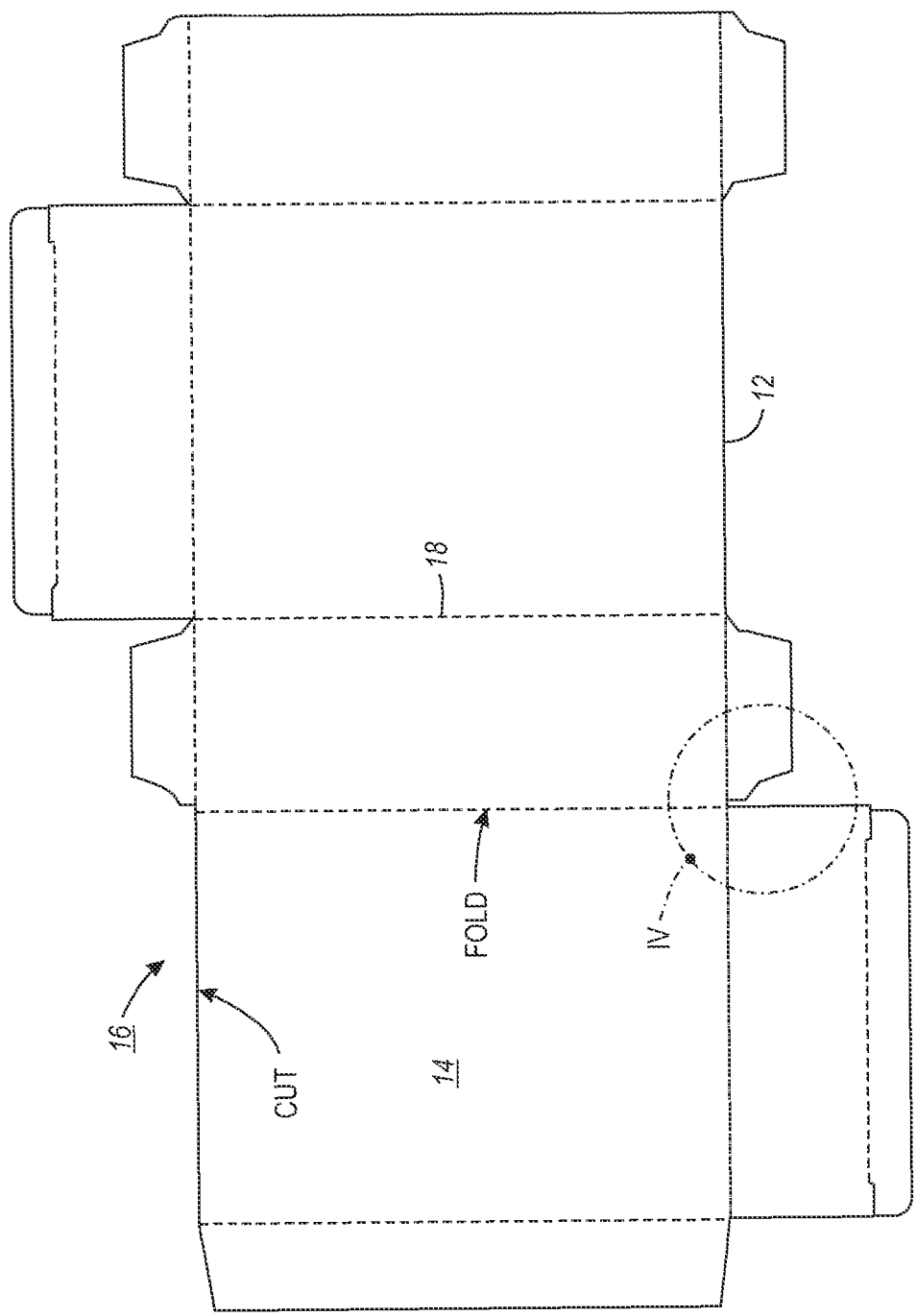
FIG. 1 is a plan view of a steel rule die cut box.

FIG. 1 illustrates a template of a box cut and formed by a steel rule die produced in accordance with the method disclosed below. The die making system 10 creates a flat steel rule die 11, or a cylinder die 11' that may be used in conventional box making machinery. The steel rule die cuts 12 the sheet material 14 in the areas shown in solid lines, forming a box blank 16, and forms a crease 18 in the sheet material in the areas shown in dotted lines, to facilitate folding the box blank 16 into a box. The perimeter material outside of the solid lines is discarded for recycling.

The subject die making system 10 includes a method of making a steel rule die 11, 11' that could be made within hours at a box manufacturing location. The die 11, 11' is constructed from multiple slugs 20, 20', each of the slugs 20, 20' having a proximal end portion defining a head 22, a distal end portion defining a penetrating point 24, and a shaft 26 extending from the head 22 to the point 24. Each slug 20, 20' is positioned in X, Y and Z directions and the penetrating point 24 is driven into a substrate material 28, 28' such that the upper surface 30 of the head 22 forms a segment 32 of the operative surface 34 of the steel rule die 11, 11'. In a first variation, the penetrating point 24 of each slug 20, 20' is driven sufficiently far into the substrate 28, 28' that the slug 20, 20' is permanently mounted to the substrate 28, 28'. In a second variation described in greater detail below, the penetrating point 24 of each slug 20, 20' is only driven into the substrate 28, 28' a sufficient distance to temporarily mount the slug 20, 20' to the substrate 28, 28'. A phase changing substance 36 is used to permanently fasten the slugs 20, 20' to the substrate 28, 28'.

Figure 13:
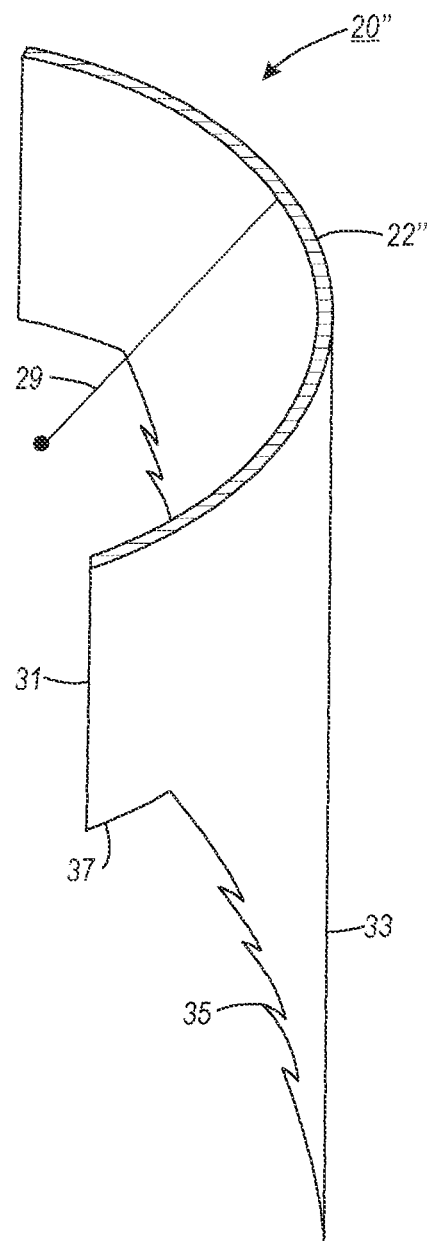
FIG. 13 is an enlarged perspective view of a second embodiment of a slug.
Figure 14:
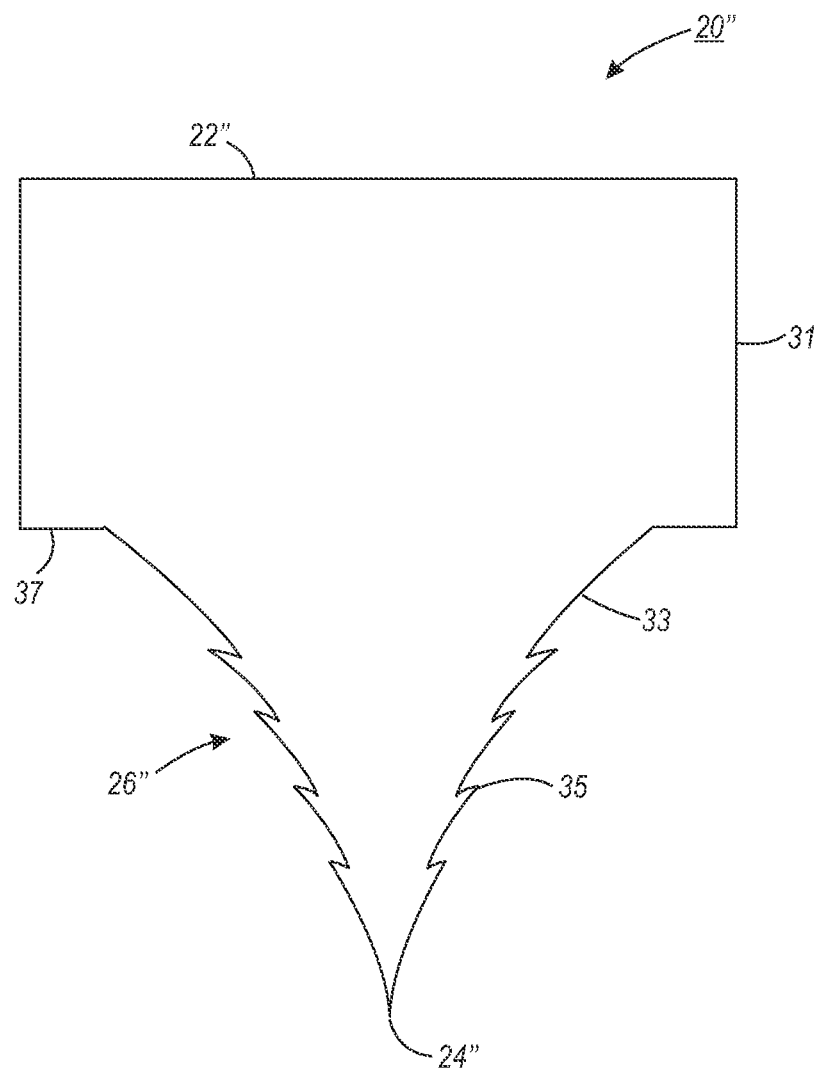
FIG. 14 is a front view of the slug of FIG. 13.

It should be appreciated that although the contour of the head upper surface 30 of the slug 20, 20' has a predetermined shape defined by its designated position in the steel rule die 11, 11', the slug 20, 20' may have the general shape of a conventional fastener, such as a staple, nail, or brad, a shape that is customized for a particular job, or a shape that is usable for many jobs but customized for use in the subject system 10. Examples of customized shapes include rectangular slugs for use in forming straight die sections, or curved slugs 20" for use in forming radiuses common to many boxes. For example, the head 22" of the curved slug 20" shown in FIGS. 13 and 14 has a radius 29 that is commonly used in packaging applications. The shaft 26" of the slug 20" includes an upper portion 31 and a lower portion 33. Barbs 35 extending from the shaft lower portion 33 provide an improved grip between the shaft 26" and the substrate 28, 28'. A shoulder 37 on the shaft upper portion 31 contacts the surface of the substrate 28, 28' to prevent the slug 20" from being driven too far into the substrate 28, 28'.

Slugs 20, 20' that are to be used in sections of the die that will form a crease 18 in the sheet material 14, rather than cutting 12 the sheet material 14, may have a blunt-head shape. Alternatively, slugs 20, 20' that are to be used in sections of the die that will form a crease 18 in the sheet material 14 may be driven further into the substrate 28, 28' than the slugs 20, 20' that are to be used in sections of the die 11, 11' that will cut 12 the sheet material 14. When the die 11, 11' is in operation, the deeply driven slugs 20, 20' will not be pressed into the sheet material 14 a sufficient distance to sever the sheet material 14.

Figure 2:
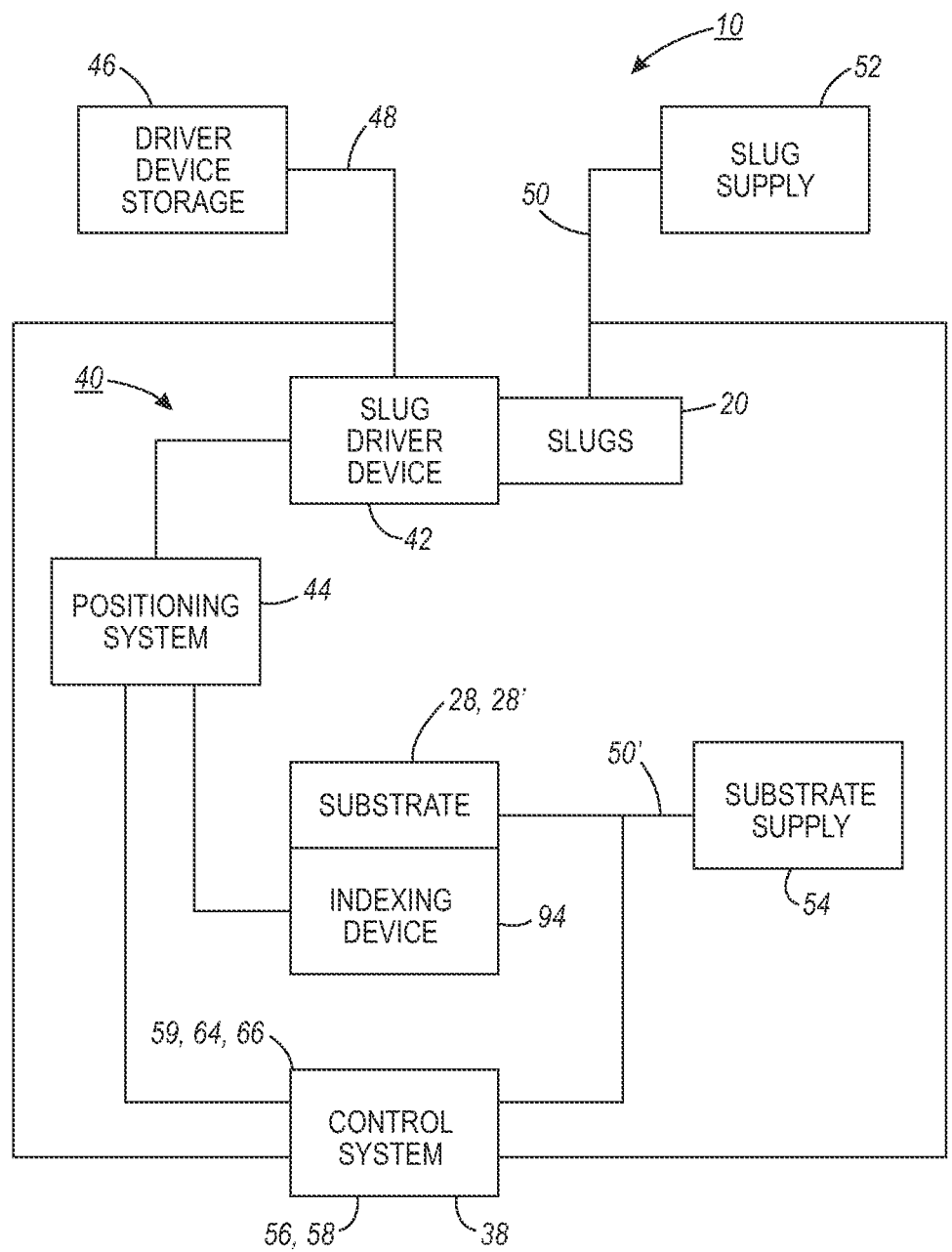
FIG. 2 is a schematic view of a segmented steel rule type die making system in accordance with the present disclosure.

With reference to FIG. 2, the die making system 10 includes a control system 38, a die manufacturing station 40, one or more slug driver devices 42, and a positioning system 44, with the control system 38 controlling the operation of the slug driver devices 42 and positioning system 44. If the system 10 includes more than one slug driver device 42, the slug driver devices 42 that are not required for immediate use at the die manufacturing station 40 may be stored in driver device storage area 46, such as a carousel. The die making system 10 may also include a driver device installation system 48 that 1) transports driver devices 42 from the driver device storage area 46 to the die manufacturing station 40 when required by the operating system and 2) transports driver devices 42 from the die manufacturing station 40 to the driver device storage area 46 when no longer required by the operating system. The die making system 10 may further include a material transport system 50 to convey slugs 20 from a slug supply depot 52 to the slug driver device 42 and/or a material transport system 50' to convey substrates 28, 28' from a substrate supply depot 54 to the die manufacturing station 40. In this case, the control system 38 also controls the material transport systems 50, 50'.

The control system includes a CPU 56, permanent memory 58 such as a hard drive, temporary memory, a user interface, a display and input/output (I/O) devices. The slug driver devices 42 may include nail/brad/staple driver devices known in the art for driving conventional nails, brads and staples if the slug driver devices 42 are compatible with the slugs 20, 20' that are to be installed during the manufacture of the steel rule die 11, 11'. Custom designed slug driver devices 42 may be used to install slugs 20, 20' that cannot be installed by conventional nail/brad/staple driver devices.

Figure 3B:
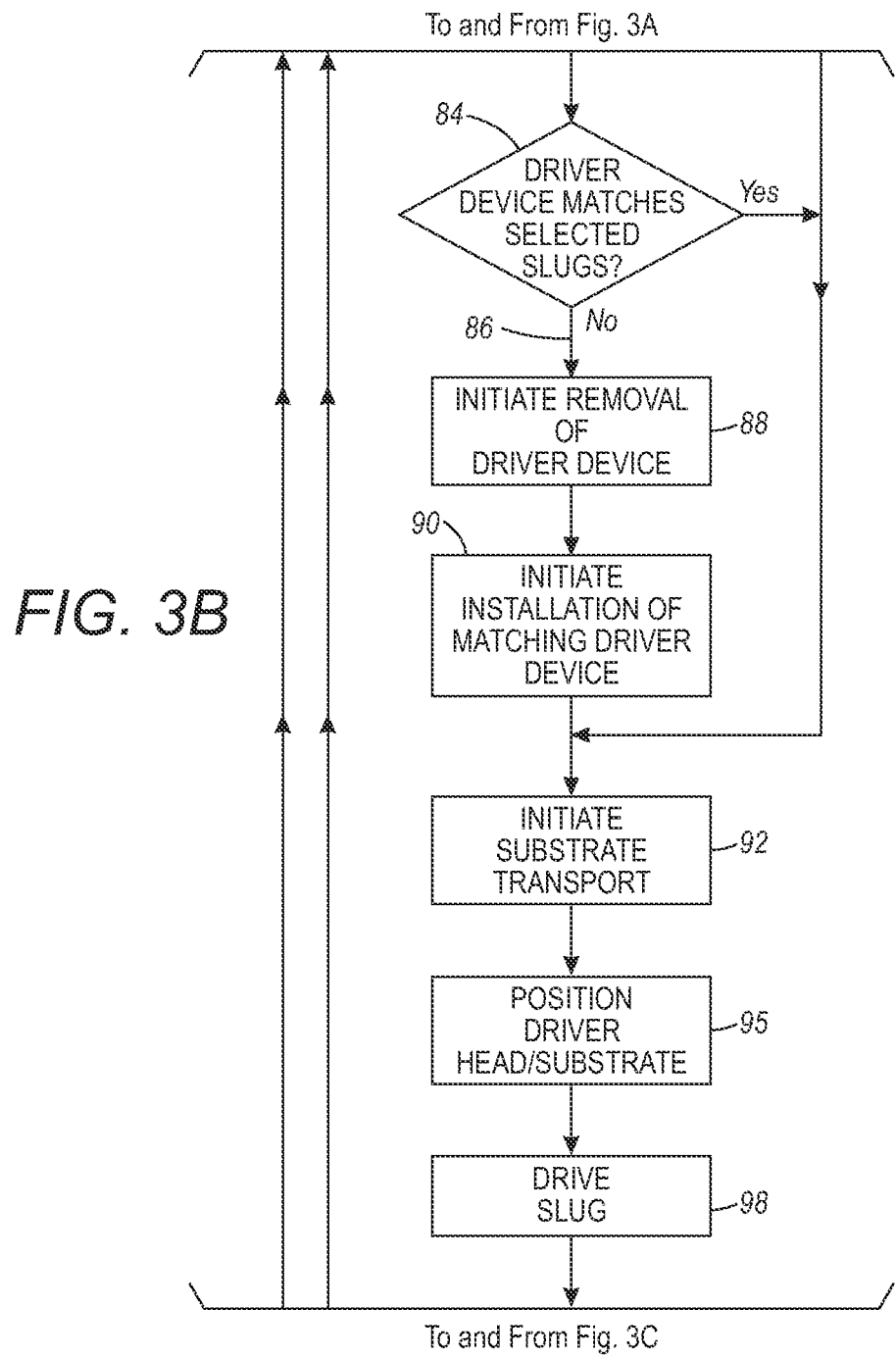
Figure 3C:
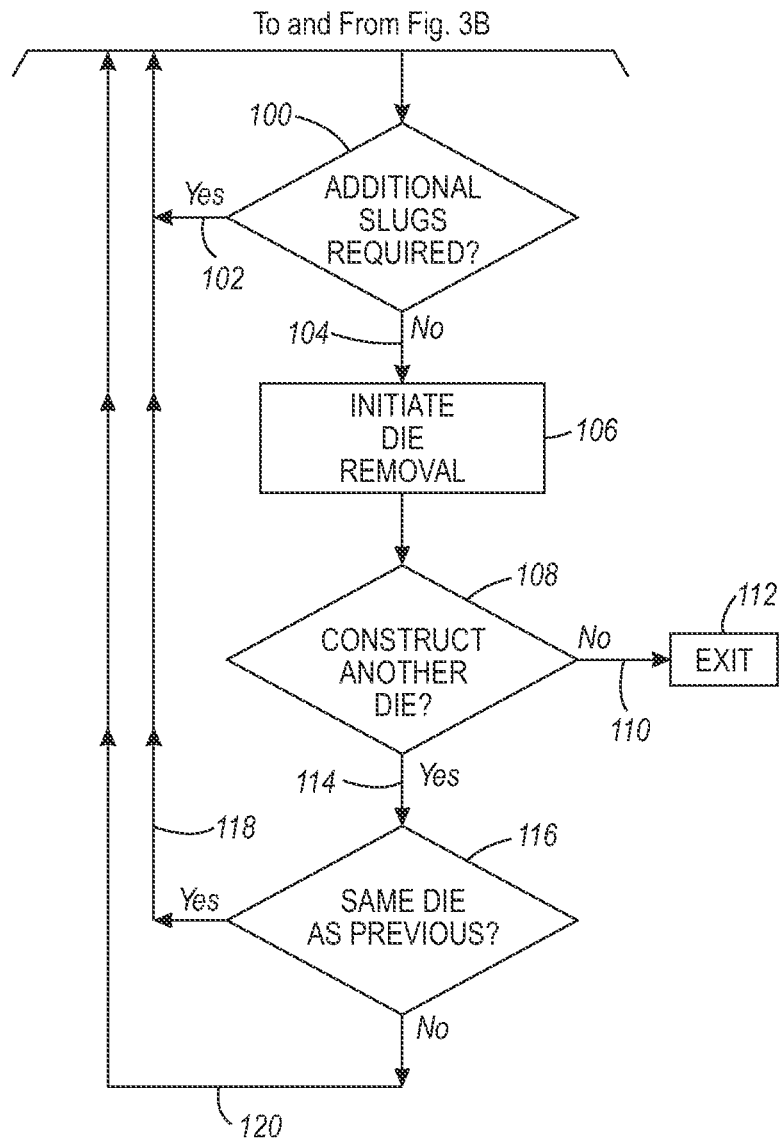

To initiate the die making method (FIGS. 3A, 3B, 3C), a digital file 59 defining a box pattern such as that shown in FIG. 1 is created 60 and stored 62 in the control system permanent memory 58. A database 64 including an inventory of the types of slugs 20, 20' that are available for use by the system 10 and the types of slug driver devices 42 that are included in the system 10 is also stored in the control system permanent memory 58. An operating system 66 stored in the permanent memory 58 accesses the box pattern file and operates one or more of the system slug driver devices 42 to create the steel rule dies 11, 11' defined by the box pattern digital file 59.

More specifically, when a box pattern digital file 59 is loaded 68, the operating system 66 determines 70 which of the slug types listed in the database 64 will be used to form the steel rule die 11, 11' and which of the slug driver devices 42 listed in the database 64 will be used to install the selected slugs 20, 20'. The controller 38 determines 72 whether or not the selected slugs 20, 20' are available at the die manufacturing station 40. If the slugs available at the die manufacturing station are not 74 the selected slugs, the controller 38 initiates 76 removal of the non-selected slugs 20, 20' and initiates 78 transport of the selected slugs 20, 20' by starting the material transport system 50 (if available), or transmitting a message to the operator (if a material transport system is not available).

The controller determines 80 whether or not a slug driver device 42 is installed at the die manufacturing station 40. If a slug driver device is installed 82 at the die manufacturing station, the controller 38 then compares 84 the installed slug driver device 42 to the slug driver device selected by the operating system 66. If the slug driver device 42 installed at the die manufacturing station 40 is not 86 the selected slug driver device 42, the controller 38 initiates 88 removal of the installed slug driver device 42 and initiates 90 installation of the selected slug driver device 42. In the event that the system 10 includes a slug driver device installation system 48, the controller 38 commands the installation system 48 to remove the installed slug driver device 42 from the die manufacturing station 40 and transport it to the driver device storage area 46, and then transport the selected slug driver device 42 from the driver device storage area 46, and install it at the die manufacturing station 40. In the event that the system 10 does not include a slug driver device installation system 48, the controller 38 transmits a message informing the operator that the slug driver devices 42 at the die manufacturing station 40 must be changed manually.

If the system 10 includes either the slug material transport system 50 or the substrate material transport system 50', the controller 38 initiates operation of the transport system to supply the selected slugs to the installed slug driver device and/or to supply 92 substrate 28, 28' to an indexing bench 94 at the die manufacturing station 40. If the system 10 does not include either the slug material transport system 50 or the substrate material transport system 50', the controller 38 transmits a message informing the operator that the selected slugs 20, 20' and/or the substrate 28, 28' must be supplied at the die manufacturing station 40 must be changed manually.

Figure 4:
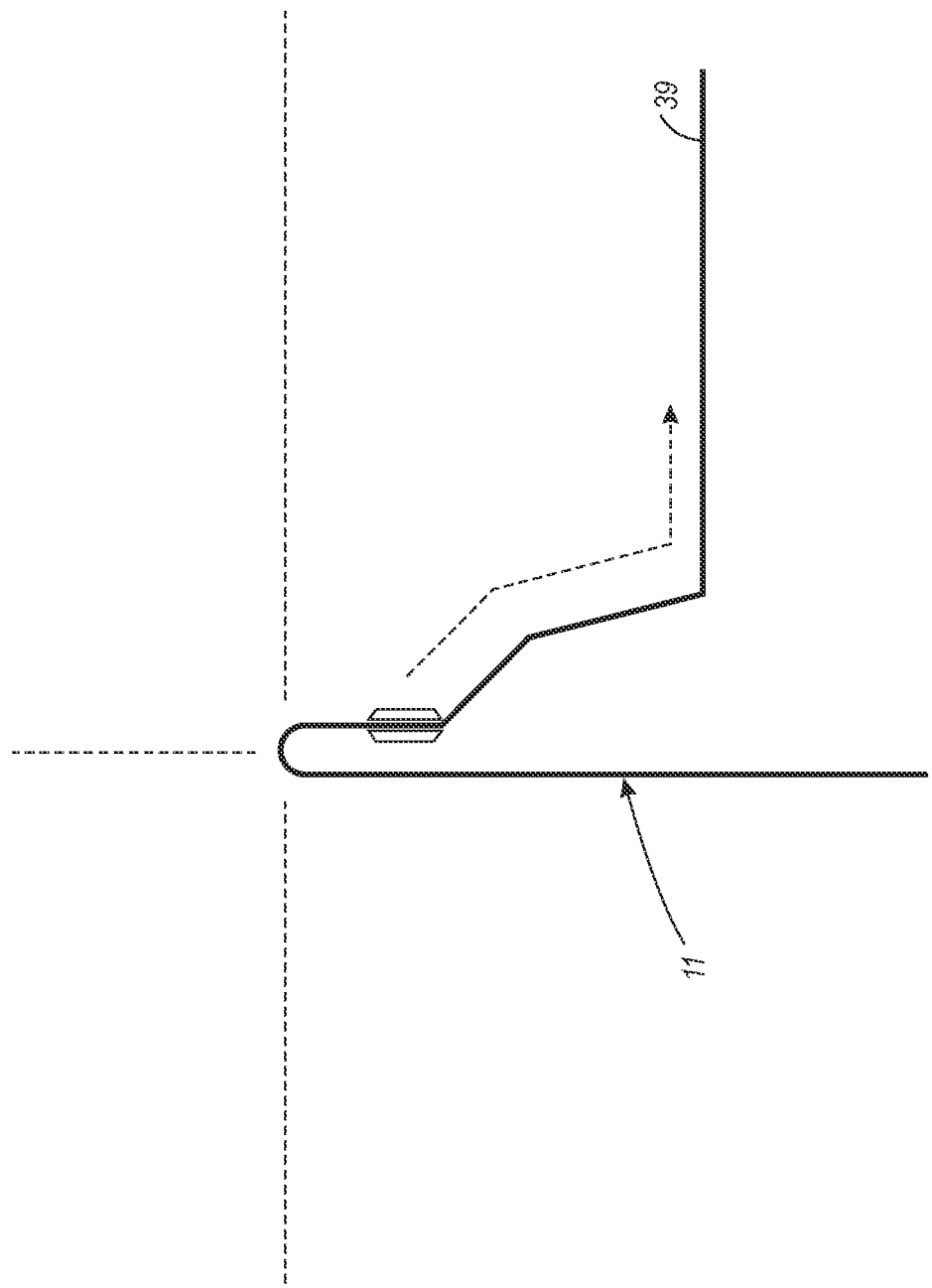
FIG. 4 is an enlarged schematic view of a portion of a segmented steel rule for the box of FIG. 1 made in accordance with the present disclosure.

The indexing bench 94 securely holds the substrate 28, 28' in position while each slug 20, 20' is driven into the substrate 28, 28'. With additional reference to FIG. 4, the positioning system 44 positions 95 either the indexing bench 94 and the substrate 28, 28' relative to the driver head 96 of the slug driver device 42, or the driver head 96 of the slug driver device 42 relative to the substrate 28, 28', as each subsequent slug 20, 20' is driven 98 into the substrate 28, 28'. The substrate 28, 28' and/or the driver head 96 of the slug driver device 42 is articulated in the X, Y, and Z directions by the positioning system 44 under the command of the controller 38.

Figure 11:
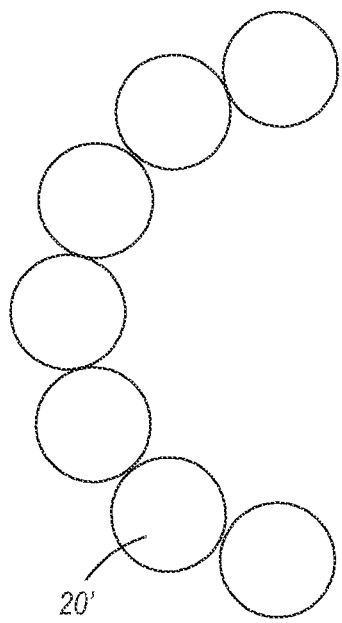
FIG. 11 is an enlarged top view of circular-shaped slugs driven into a substrate to form a radius curve.
Figure 12:
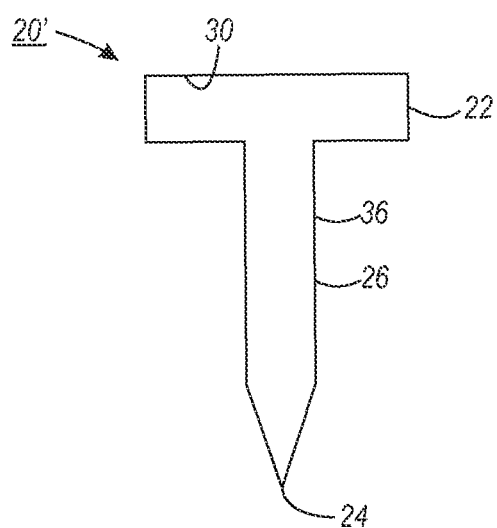
FIG. 12 is an enlarged schematic view of a first embodiment of a slug.

The slug driver device 42 is tailored to drive the slugs 20, 20' tightly adjacent to each other. The individual slugs 20, 20' define small die segments 32 that form a continuous steel rule die 11. 11'. As illustrated in FIG. 11, slugs 20' may be positioned such that they form radiused sections of the die 11, 11'. Conventionally, steel rule dies 11, 11' are formed by bending steel stock to form one contiguous piece of metal that is inserted into a slot that is pre-cut in a substrate. This requires many operations performed by hand by skilled craftsmen. The subject system 10 provides an automated method that allows dies to be made without all the handcrafting needed in traditional steel rule dies.

After each slug 20, 20' is driven 98, the controller 38 determines 100 whether or not additional slugs must be driven to complete the die 11, 11'. If additional slugs 20, 20' are required 102, the controller ensures that the slug 20, 20' available at the die manufacturing station is the slug 20, 20' selected as the subsequent slug 20, 20' and that the slug driver device 42 installed at the die manufacturing station 40 is capable of driving the subsequent slug 20, 20', as described above. If additional slugs 20, 20' are not required 104 and the system 10 includes the substrate material transport system 50', the controller 58 initiates operation of the substrate material transport system 50' to remove 106 the completed die 11, 11' and supply new substrate 28, 28' to the indexing bench 94. If additional slugs 20, 20' are not required 104 and the system 10 does not include the substrate material transport system 50', the controller 38 transmits a message informing the operator that the completed die 11, 11' must be removed manually from the die manufacturing station 40 and that new substrate 28, 28' must be supplied manually at the die manufacturing station 40.

Finally, the controller 38 determines 108 whether an additional die 11, 11' must be manufactured. If no additional dies 11, 11' are required 110, the controller 38 places the system in standby or shuts-down the system 112. If an additional die 11, 11' is required 114, the controller 38 determines 116 whether the additional die 11, 11' is of the same type as the previous die 11, 11'. If the additional die 11, 11' is the same type 118, the controller 38 determines 70 whether or not the selected slugs 20, 20' are available at the die manufacturing station 40 and whether or not the proper slug driver device 42 is installed at the die manufacturing station 40. If the additional die 11, 11' is not the same type 120, the controller either loads 68 the proper box pattern digital file 59 or prompts the operator to load the proper box pattern digital file 59.

Figure 5:
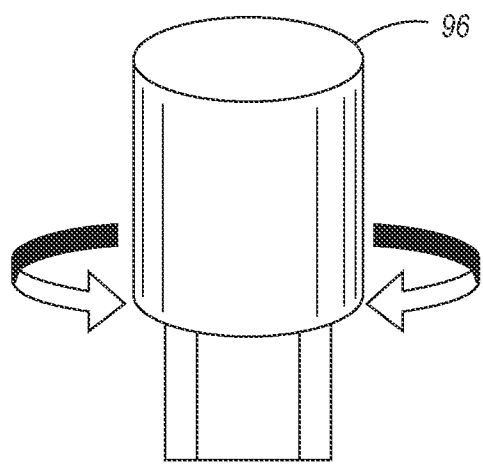
FIG. 5 is a perspective view of a driver head for slugs having a rectangular shape.
Figure 6:
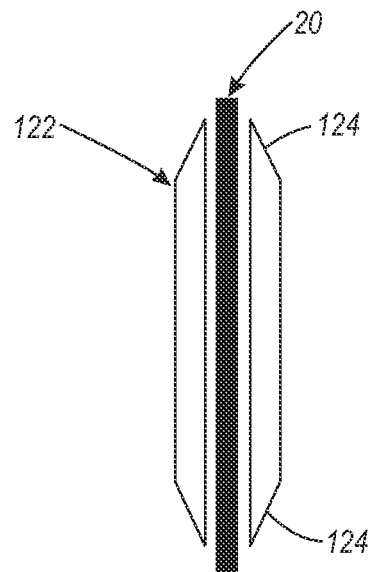
FIG. 6 is a bottom view of the driver head of FIG. 5.
Figure 7:
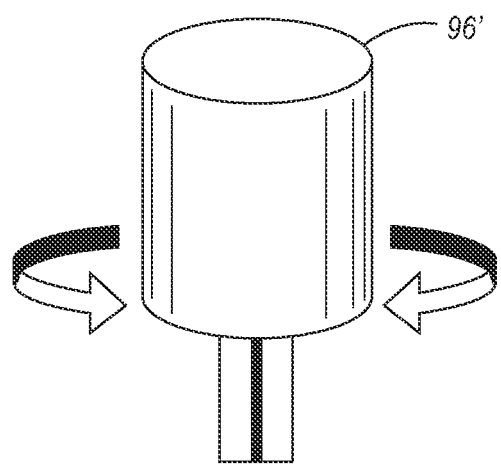
FIG. 7 is a perspective view of a driver head for slugs having a circular shape.
Figure 8:
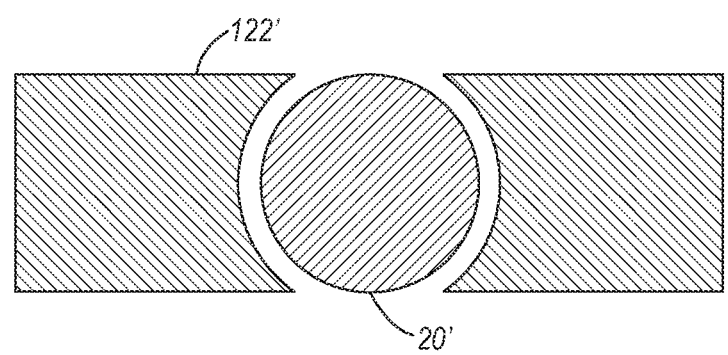
FIG. 8 is a bottom view of the driver head of FIG. 7.

FIGS. 5 and 6 illustrate one embodiment of a driver head 96 for slugs 20 having a rectangular shape. The driver head 96 includes two side members 122 that temporarily clamp the slug 20 between them. Each of the side members 122 have oppositely disposed guide edges 124 that facilitate inserting the driver head 96 into corners. FIGS. 7 and 8 illustrate one embodiment of a driver head 96' for slugs 20' having a circular shape. This driver head 96' also includes two side members 122' that temporarily clamp the slug 20' between them. The driver head 96, 96' may be rotated about their axis to position the slug 20, 20' relative to the substrate 28, 28'. A piston propels the drive head 96, 96' toward the substrate 28, 28' to embed the slugs 20, 20' in the substrate 28, 28'.

Figure 9:
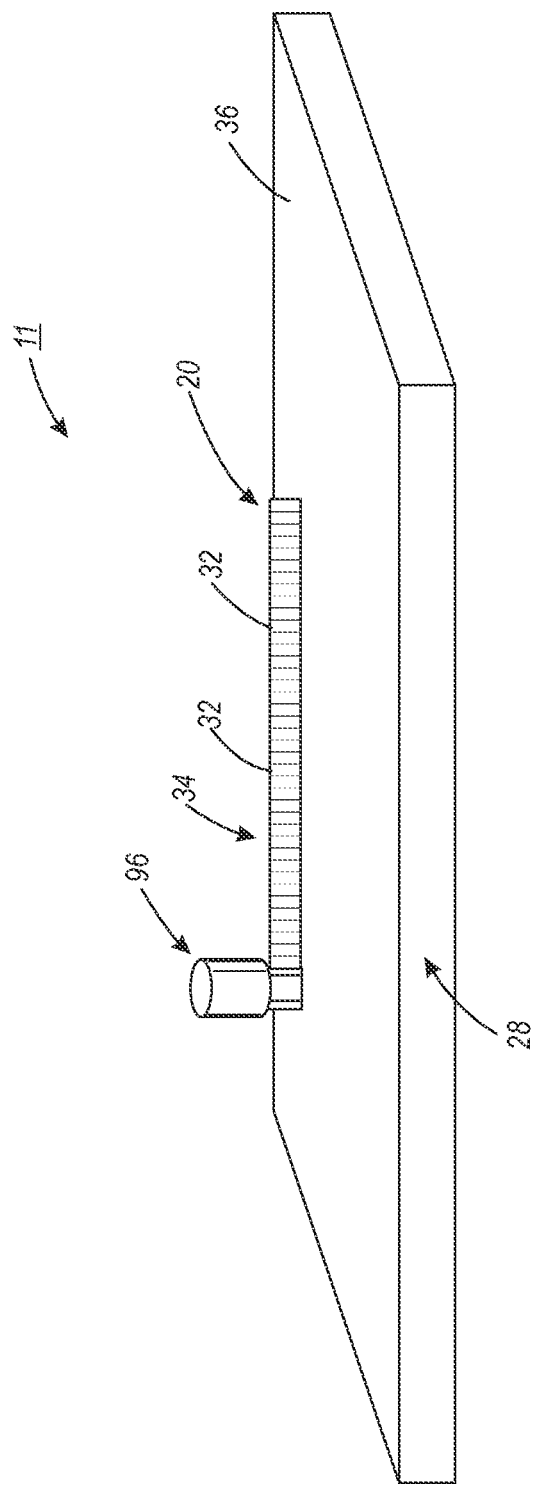
FIG. 9 is a schematic perspective view of the driver head of FIGS. 5 and 6 driving slugs into a flat substrate.
Figure 10:
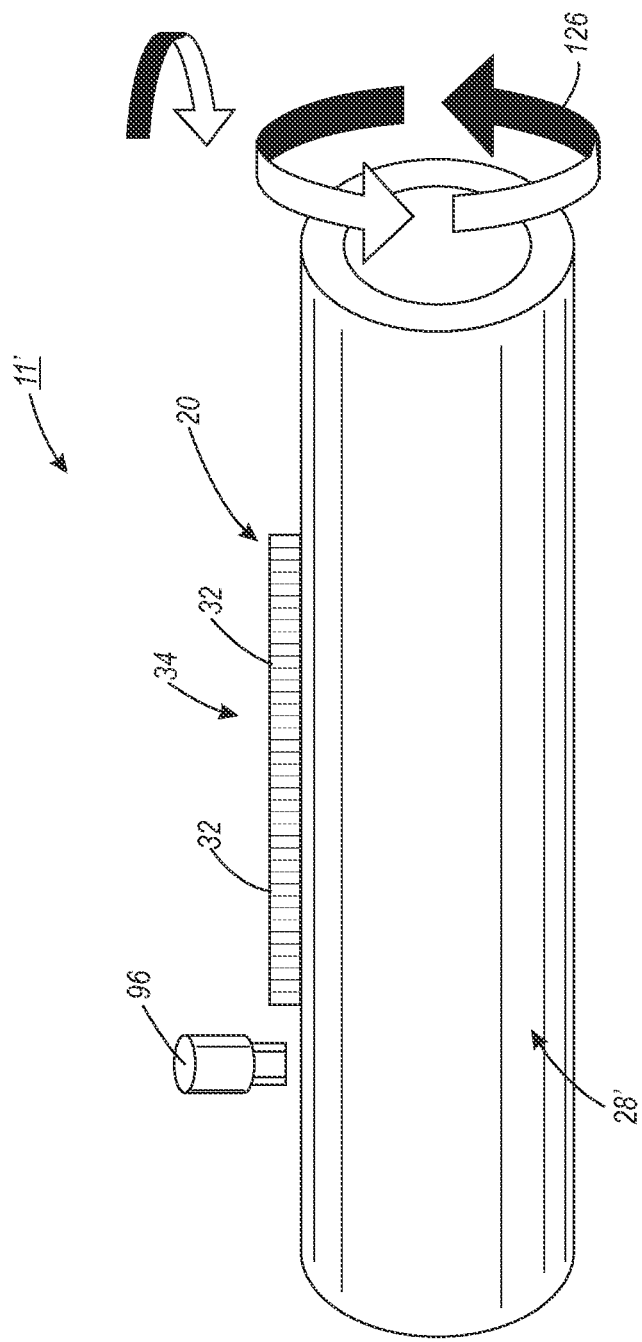
FIG. 10 is a schematic perspective view of the driver head of FIGS. 5 and 6 driving slugs into a cylindrical substrate.

With additional reference to FIGS. 9 and 10, the substrate may be flat 28 or cylindrical 28' to construct 11, 11' dies for either flat platen type die cutters or rotary type dye cutters. In the case of the flat die 11, the driver head 96, 96' or substrate 28 would be driven such that the driver head 96, 96' moved over the surface of the substrate 96 in X, Y, and Z directions. In the case of the cylindrical or rotary die 11', the driver head 96, 96' or substrate 28' could be driven such that the driver head 96, 96' moves over the substrate 28' in the X, Y, and Z directions, but additionally the cylindrical substrate 28' would rotate 126 about its axis to enable driving of die features over the entire surface of the substrate 28'. Slugs 20, 20' that are to be utilized for manufacturing the rotary die 11' could be wedge shape with an arch at the cutting/scoring end to match the radius of the rotary die 11'.

As disclosed above, a second variation of the subject system utilizes a phase changing substance 36, such as epoxy or UV curable polymer (Engineering adhesive) to permanently fasten the slugs 20, 20' to the substrate 28, 28'. In this variation, the penetrating points 24 of the slugs 20, 20' are driven into the substrate 28, 28' a predetermined distance whereby the slugs 20, 20' are temporarily mounted to the substrate 28, 28'. An epoxy or other curable substance would then be flowed into surface of the substrate 28, 28' and set or hardened, thereby permanently mounting the slugs 20, 20' to the substrate 28, 28'. Another implementation of this variation would be to have blank substrates 28, 28' that are pre-coated with engineering adhesive and then drive slugs 20, 20' into the pre-coated substrate 28, 28'. A third implementation could be to have the slugs 20, 20' pre-coated with a phase changing substance 36 that is hardened after being driven into the substrate 28, 28'. The advantages of this variation would be to decrease the drive force necessary to drive the slugs 20, 20' and increase strength of the finished die 11, 11' yielding durable die while using a quieter process.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A steel rule die making system to manufacture a steel rule die having an operative surface that forms creases and cuts patterns in a sheet material, the system comprising:
   a die manufacturing station including an indexing bench adapted to securely hold a substrate;
   at least one slug driver device disposed adjacent the die manufacturing station, the slug driver device being adapted to drive a penetrating point of a slug into the substrate, whereby an upper surface of a head of the slug defines a segment of the operative surface of the steel rule die;
   a control system in communication with the slug driver device;
   a positioning system connected to at least one of the indexing bench or the slug driver device, and in communication with the control system, the positioning system positioning in an X, a Y and a Z direction at least one of:
      the indexing bench relative to a driver head of the slug driver device; or
      the driver head of the slug driver device relative to the indexing bench;
      whereby the upper surface of the head of each slug driven by the slug driver device is positioned in the operative surface of the steel rule die; and
   a material transport system in communication with the control system, the material transport system being adapted to convey substrate from a substrate supply depot to the die manufacturing station.

2. The steel rule die making system of claim 1 wherein the material transport system is also adapted to convey slugs from a slug supply depot to the slug driver device.

3. A steel rule die making system to manufacture a steel rule die having an operative surface that forms creases and cuts patterns in a sheet material, the system comprising:
   a die manufacturing station including an indexing bench adapted to securely hold a substrate;
   a plurality of slug driver devices, each of the slug driver devices being adapted to drive a penetrating point of at least one type of slug into the substrate whereby an upper surface of a head of the slug defines a segment of the operative surface of the steel rule die, at least one of the slug driver devices disposed adjacent the die manufacturing station;
   a control system in communication with the at least one slug driver device; and
   a positioning system connected to at least one of the indexing bench or the at least one slug driver device, and in communication with the control system, the positioning system positioning in an X, a Y and a Z direction at least one of:
      the indexing bench relative to a driver head of the at least one slug driver device; or
      the driver head of the at least one slug driver device relative to the indexing bench;
      whereby the upper surface of the head of each slug driven by the at least one slug driver device is positioned in the operative surface of the steel rule die;
   wherein the control system includes a memory having at least one digital file defining a box pattern and a database having an inventory of the slugs that are available for use by the steel rule die making system and the slug driver devices that are included in the steel rule die making system.

4. A steel rule die making system to manufacture a steel rule die having an operative surface that forms creases and cuts patterns in a sheet material, the system comprising:
   a die manufacturing station including an indexing bench adapted to securely hold a substrate;
   a driver device storage area;
   a plurality of slug driver devices, each of the slug driver devices being adapted to drive a penetrating point of at least one type of slug into the substrate, the plurality of slug driver devices including
      at least one slug driver device disposed adjacent the die manufacturing station, and
      at least one slug driver device disposed in the driver device storage area;
   a positioning system connected to at least one of the indexing bench or the slug driver device disposed adjacent the die manufacturing station;
   a control system in communication with the slug driver device disposed adjacent the die manufacturing station and the positioning system;
   and
   a slug drive device installation system connected to the die manufacturing station and the driver device storage area, and in communication with the control system.

5. The steel rule die making system of claim 4 further comprising a material transport system in communication with the control system, the material transport system being adapted to convey substrate from a substrate supply depot to the die manufacturing station.

6. The steel rule die making system of claim 5 wherein the material transport system is also adapted to convey slugs from a slug supply depot to an installed slug driver device.

7. A steel rule die making system to manufacture a steel rule die having an operative surface that forms creases and cuts patterns in a sheet material, the system comprising:
   a die manufacturing station including an indexing bench adapted to securely hold a substrate;
   a plurality of slug driver devices, at least one of the slug driver devices being disposed adjacent the die manufacturing station, each of the slug driver devices being adapted to drive a penetrating point of at least one type of slug into the substrate, whereby an upper surface of a head of the slug defines a segment of the operative surface of the steel rule die;
   a control system in communication with the at least one slug driver devices;
   a positioning system connected to at least one of the indexing bench or the at least one slug driver device, and in communication with the control system, the positioning system positioning at least one of:

the indexing bench relative to a driver head of the at least one slug driver device; or the driver head of the at least one slug driver device relative to the indexing bench;

whereby the upper surface of the head of each slug driven by the slug driver device is positioned in the operative surface of the steel rule die;

a driver device storage area to store the slug driver devices; and a slug drive device installation system connected to the die manufacturing station and the driver device storage area, and in communication with the control system.

8. A steel rule die making system to manufacture a steel rule die having an operative surface that forms creases and cuts patterns in a sheet material, the system comprising:

a die manufacturing station including an indexing bench adapted to securely hold a substrate;

at least one slug driver device disposed adjacent the die manufacturing station, the slug driver device being adapted to drive a penetrating point of at least one type of slug into the substrate, whereby an upper surface of a head of the slug defines a segment of the operative surface of the steel rule die;

a control system in communication with the slug driver device;

a positioning system connected to at least one of the indexing bench or the slug driver device, and in communication with the control system, the positioning system positioning at least one of:

the indexing bench relative to a driver head of the slug driver device; or the driver head of the slug driver device relative to the indexing bench;

whereby the upper surface of the head of each slug driven by the slug driver device is positioned in the operative surface of the steel rule die; and a material transport system in communication with the control system, the material transport system being adapted to convey substrate from a substrate supply depot to the die manufacturing station.

9. The steel rule die making system of claim 8 wherein the material transport system also conveys slugs from a slug supply depot to the slug driver device.

10. A steel rule die making system to manufacture a steel rule die having an operative surface that forms creases and cuts patterns in a sheet material, the system comprising:

a die manufacturing station including an indexing bench adapted to securely hold a substrate;

a plurality of slug driver devices, at least one of the slug driver devices being disposed adjacent the die manufacturing station, each of the slug driver devices being adapted to drive a penetrating point of at least one type of slug into the substrate, whereby an upper surface of a head of the slug defines a segment of the operative surface of the steel rule die;

a control system in communication with the at least one slug driver device; and a positioning system connected to at least one of the indexing bench or the at least one slug driver device, and in communication with the control system, the positioning system positioning at least one of:

the indexing bench relative to a driver head of the at least one slug driver device; or the driver head of the at least one slug driver device relative to the indexing bench;

whereby the upper surface of the head of each slug driven by the at least one slug driver device is positioned in the operative surface of the steel rule die;

wherein the control system includes a memory having at least one digital file defining a box pattern and a database having an inventory of the slugs that are available for use by the steel rule die making system and the slug driver devices that are included in the steel rule die making system.

* * * * *